US012783215B2

(12) United States Patent
Votintseva et al.

(10) Patent No.: US 12,783,215 B2
(45) Date of Patent: Nov. 3, 2026

(54) MANAGING AN APP, SUCH AS DEVELOPING AN APP INCLUDING DEVELOPING A USER INTERFACE OF THE APP, METHOD, AND SYSTEM

(71) Applicants: Siemens Industry Software GmbH, Cologne (DE); Siemens Aktiengesellschaft, Munich (DE)

(72) Inventors: Anjelika Votintseva, Munich (DE); Filippos Petridis, Berlin (DE)

(73) Assignees: Siemens Industry Software GmbH, Cologne (DE); Siemens Aktiengesellschaft, Munich (DE)

( * ) Notice: Subject to any disclaimer, the term of this patent is extended or adjusted under 35 U.S.C. 154(b) by 159 days.

(21) Appl. No.: 18/476,795

(22) Filed: Sep. 28, 2023

(65) Prior Publication Data

US 2025/0110706 A1 Apr. 3, 2025

(51) Int. Cl.
*G06F 8/38* (2018.01)
*G06F 8/33* (2018.01)

(52) U.S. Cl.
CPC . *G06F 8/33* (2013.01); *G06F 8/38* (2013.01)

(58) Field of Classification Search
CPC ........................................................ G06F 8/38
See application file for complete search history.

(56) References Cited

U.S. PATENT DOCUMENTS 8,793,568 B2 * 7/2014 Aman ...................... G06F 8/38 715/764
9,841,956 B2 * 12/2017 Bornheimer ............. G06F 8/77
9,880,712 B2 * 1/2018 Slawson ................... G06F 8/65
10,228,829 B1 * 3/2019 Shiva ................ G06Q 30/0241
10,489,126 B2 * 11/2019 Kumar ................. G06V 30/422
10,572,126 B2 * 2/2020 Fitzpatrick ............ G06F 40/186
10,855,552 B2 * 12/2020 Kaw ................... H04L 41/0843
10,969,935 B2 * 4/2021 Butcher ................ G06F 3/0482
11,593,074 B2 * 2/2023 Kang ........................ G06F 8/36
11,675,967 B2 * 6/2023 Sharma ..................... G06F 8/38 715/235
11,714,612 B2 * 8/2023 Accardo ............ G06F 11/3438 717/113

(Continued)

FOREIGN PATENT DOCUMENTS

CA 3178385 A1 * 11/2021 .......... G06F 3/0482
WO WO-2022111954 A1 * 6/2022 .............. G06F 8/34

*Primary Examiner* — Francisco J Aponte

(74) *Attorney, Agent, or Firm* — Lempia Summerfield Katz LLC

(57) ABSTRACT

For an improved management of an app, a computer-implemented method is provided. The method includes: providing an app development user interface (UI) of an app development platform to a user for developing the app; providing several UI parameters characterizing several properties of an app UI of the app; determining at least one sample app UI based on the provided UI parameters; displaying the respective sample app UI to the user via the app development UI; receiving user input indicative of an amendment to at least one of the properties of the sample app UI via the app development UI; determining amended UI parameters using the received user input; determining at least one updated sample app UI using the respective, amended UI parameter; and developing the app through the app development UI by using the updated sample app UI.

20 Claims, 5 Drawing Sheets

(56) References Cited

U.S. PATENT DOCUMENTS

| | | | | |
|---|---|---|---|---|
| 11,720,621 | B2 * | 8/2023 | Lombardo | G06F 16/906 715/700 |
| 11,797,428 | B2 * | 10/2023 | Rao | G06F 8/38 |
| 11,847,432 | B2 * | 12/2023 | Madhugiri | G06V 30/416 |
| 11,941,417 | B1 * | 3/2024 | Kim | G06F 9/451 |
| 11,960,864 | B2 * | 4/2024 | Kaliyaperumal | G06V 30/413 |
| 12,120,124 | B1 * | 10/2024 | Davis | H04L 63/105 |
| 12,135,959 | B2 * | 11/2024 | Arai | G06F 8/33 |
| 12,165,077 | B2 * | 12/2024 | Avadhanula | G06N 5/04 |
| 12,314,536 | B1 * | 5/2025 | Browder | G06F 3/0482 |
| 12,430,103 | B1 * | 9/2025 | Domeniconi | G06F 8/30 |
| 2014/0101528 | A1 * | 4/2014 | Pelleg | G06F 8/38 715/234 |
| 2015/0186132 | A1 * | 7/2015 | Oliveri | G06F 8/34 717/120 |
| 2016/0154629 | A1 | 6/2016 | Noens et al. | |
| 2019/0250891 | A1 | 8/2019 | Kumar et al. | |
| 2019/0369969 | A1 * | 12/2019 | Donohoe | G06F 8/33 |
| 2020/0326914 | A1 * | 10/2020 | Koelewijn | G06F 8/36 |
| 2021/0397418 | A1 | 12/2021 | Nikumb et al. | |
| 2022/0107790 | A1 * | 4/2022 | Naghshin | G06F 40/186 |
| 2022/0335720 | A1 * | 10/2022 | Chang | H04N 5/2224 |
| 2022/0391846 | A1 * | 12/2022 | Beaver, III | G06Q 30/0621 |
| 2022/0405065 | A1 * | 12/2022 | Appel | G06F 8/73 |
| 2023/0025371 | A1 * | 1/2023 | Syed | G06Q 10/0631 |
| 2023/0115185 | A1 * | 4/2023 | Huang | G06F 8/33 |
| 2023/0367451 | A1 * | 11/2023 | Toudji | G06F 3/0482 |
| 2023/0409298 | A1 * | 12/2023 | Ciminelli | G06F 40/40 |
| 2023/0418459 | A1 * | 12/2023 | Ciminelli | G06F 40/30 |
| 2024/0320444 | A1 * | 9/2024 | Maschmeyer | G06F 3/04845 |
| 2024/0428087 | A1 * | 12/2024 | Oni | G06N 5/022 |
| 2025/0021309 | A1 * | 1/2025 | Schmidt | G06F 8/34 |

* cited by examiner

MANAGING AN APP, SUCH AS DEVELOPING AN APP INCLUDING DEVELOPING A USER INTERFACE OF THE APP, METHOD, AND SYSTEM

TECHNICAL FIELD

The present disclosure is directed, in general, to software management systems, in particular systems for developing apps, which may be used to manage, build, test, deploy, and iterate such apps (collectively referred to herein as product systems).

BACKGROUND

Recently, an increasing number of computer software products is used both for personal needs and for business needs in the form of applications, throughout the present patent document simply called "apps." Such apps may be used in a mobile context as well as on cloud computing platforms and "on premise" and may provide a specific set of functions. The present disclosure generally relates to the development and the creation of such apps, such as creating an app including developing a user interface of the app.

Currently, there exist product systems and solutions that support managing or developing such apps. Such product systems may benefit from improvements.

SUMMARY

Variously disclosed embodiments include methods and computer systems that may be used to facilitate managing an app.

According to a first aspect of the disclosure, a computer-implemented method of creating an app may include: providing an app development user interface (UI) of an app development platform to a user for developing the app; providing several UI parameters characterizing several properties of an app UI of the app; determining at least one sample app UI based on the provided UI parameters; displaying the respective sample app UI to the user via the app development UI; receiving user input indicative of an amendment to at least one of the properties of the sample app UI via the app development UI; determining amended UI parameters using the received user input; determining at least one updated sample app UI using the respective, amended UI parameter; and developing the app through the app development UI by using the updated sample app UI.

According to a second aspect, a computer system may be arranged and configured to execute the steps of this computer-implemented method according to the first aspect.

According to a third aspect, a computer program product may include computer program code that, when executed by the computer system according to the second aspect, causes the computer system to carry out the method according to the first aspect.

According to a fourth aspect, a computer-readable medium may include the computer program product according to the third aspect. By way of example, the described computer-readable medium may be non-transitory and may further be a software component on a storage device.

The foregoing has outlined rather broadly the technical features of the present disclosure so that those skilled in the art may better understand the detailed description that follows. Additional features and advantages of the disclosure are described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the detailed description below, it should be understood that various definitions for certain words and phrases are provided throughout this patent document and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Figure 1:
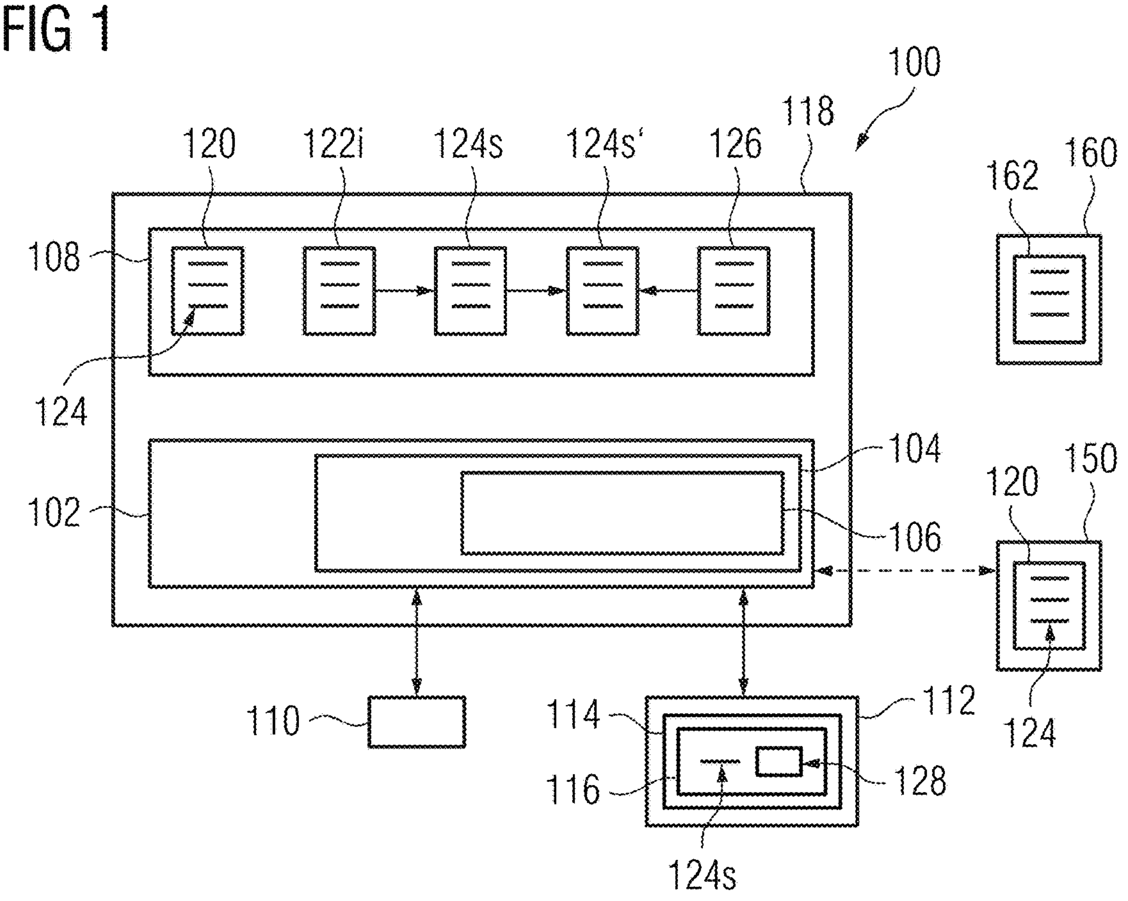
FIG. 1-4 depict a functional block diagram of an example system that facilitates managing an app in a product system, respectively.

Various technologies that pertain to systems and methods for managing apps, such as creating an app including developing a user interface of the app, in a product system is now described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present patent document is described with reference to exemplary non-limiting embodiments.

An app may refer to a software program that on execution performs specific desired tasks. Several apps may be executed in a runtime environment containing one or more operating systems ("OSs"), virtual machines (e.g., supporting Java™ programming language), device drivers, etc.

Apps, including native apps, can be created, edited, and represented using traditional source code. Examples of such traditional source code include C, C++, Java, Flash, Python, Perl, and other script-based methods of representing an app. Developing, creating, and managing such script-based apps, or parts of such script-based apps can be accomplished by manual coding of suitably trained users.

Developers may use Application Development Frameworks ("ADFs") (which are by themselves applications or apps) for implementing/developing desired apps. An ADF provides a set of pre-defined code/data modules that can be directly/indirectly used in the development of an app. An ADF may also provide tools such as an Integrated Development Environment ("IDE"), code generators, debuggers, etc., which facilitate a developer in coding/implementing the desired logic of the app in a faster/simpler manner.

An ADF may simplify app development by providing reusable components that can be used by app developers to define user interfaces ("UIs") and app logic by, for example, selecting components to perform desired tasks and defining the appearance, behavior, and interactions of the selected components. Some ADFs are based on a model-view-controller design pattern that promotes loose coupling and easier app development and maintenance.

According to another approach, apps can also be created, edited, and represented using visual model-based representations. Unlike traditional source code implementations, such apps can be created, edited, and/or represented by drawing, moving, connecting, and/or disconnecting visual depictions of logical elements within a visual modeling environment. Visual model-based representations of apps can use symbols, shapes, lines, colors, shades, animations, and/or other visual elements to represent logic, data, memory structures, or user interface elements. In order to program a traditional script-based app, programmers may be required to type out detailed scripts according to a complicated set of programming syntax rules. In contrast, programming a visual model-based app can, in some cases, be done by connecting various logical elements (e.g., action blocks and/or decision blocks) to create a visual flow chart that defines the app's operation. Similarly, defining data structures (e.g., variable types, database objects, or classes) and/or user interface elements (e.g., dropdown boxes, lists, text input boxes) in a visual model-based app can be done by drawing, placing, or connecting visual depictions of logical elements within a virtual workspace, as opposed to typing out detailed commands in a script. Visual-model based apps, including native apps, can therefore be more intuitive to program and/or edit compared to traditional script-based apps. In the present document, an approach is suggested to manage apps, such as to create an app including to develop a user interface of the app, which may involve the explained visual model-based representations.

For brevity, references to a "model," a "visual model," or an "application" or "app" should be understood to refer to visual model-based apps, including native apps, unless specifically indicated. In some cases, such visual model-based apps can represent complete, stand-alone apps for execution on a computer system. Visual model-based apps can also represent discrete modules that are configured to perform certain tasks or functions, but which do not represent complete apps. Instead, such discrete modules can be inserted into a larger app or combined with other discrete modules to perform more complicated tasks. Examples of such discrete modules can include modules for validating a ZIP code, for receiving information regarding current weather from a weather feed, and/or for rendering graphics.

Visual models may be represented in two forms: an internal representation and one or more associated visual representations. The internal representation may be a file encoded according to a file format used by a modeling environment to capture and define the operation of an app (or part of an app). For example, the internal representation may define what inputs an app can receive, what outputs an app can provide, the algorithms and operations by which the app can arrive at results, what data the app can display, what data the app can store, etc. The internal representation may also be used to instruct an execution environment how to execute the logic of the app during run-time. Internal representations may be stored in the form of non-human-readable code (e.g., binary code). Internal representations may also be stored according to a binary stored JSON (java script object notation) format, and/or an XML format. At run-time, an execution engine may use an internal representation to compile and/or generate executable machine code that, when executed by a processor, causes the processor to implement the functionality of the model.

The internal representation may be associated with one or more visual representations. Visual representations may include visual elements that depict how an app's logic flows, but which are not designed to be compiled or executed. These visual representations may include, for example, flow-charts or decision trees that show a user how the app will operate. The visual models may also visually depict data that is to be received from the user, data that is to be stored, and data that is to be displayed to the user. These visual models may also be interactive, which allows a user to manipulate the model in an intuitive way. For example, visual representations may be configured to display a certain level of detail (e.g., number of branches, number of displayed parameters, granularity of displayed logic) by default. However, users may interact with the visual representation in order to show a desired level of detail. For example, users may display or hide branches of logic and/or display or hide sets of parameters. Details relating to an element of the visual model may be hidden from view by default but can appear in a sliding window or pop-up that appears on-screen when the user clicks on the appropriate element. Users may also zoom in or out of the model, and/or pan across different parts of the model, to examine different parts of the model. Users may also copy or paste branches of logic from one section of the model into another section, or copy/paste branches of logic from a first model into a second model. In some cases, parts of the model may contain links to other parts of the model, such that if a user clicks on a link, the user will automatically be led to another part of the model. A viewing user may interact with a visual representation in at least some of the same ways that the viewing user might interact with the model if it were displayed within a modeling environment. In other words, the visual representation may be configured to mimic how the model would appear if it were displayed within a visual modeling environment. A single internal representation may correspond to multiple visual representations that use different styles or formatting rules to display app logic. For instance, multiple visual representations corresponding to the same internal representation may differ from one another in their use of color, elements that are included or omitted, and use of symbols, shapes, lines, colors, and/or shades to depict logic flow.

Approaches involving the above-described functionalities of visual model-based representations, visual model-based apps, and/or visual models are sometimes understood to be included by a so-called low-code application development platform or low-code app development platform. By way of example, such a low-code application development platform may further be described as software that provides a development environment used to create application software through graphical user interfaces and configuration instead of traditional hand-coded computer programming. A low-code model may enable developers of varied experience levels to create applications using a visual user interface in combination with model-driven logic. Such low-code application development platforms may produce entirely operational apps or require additional coding for specific situations. Low-code app development platforms may reduce the amount of traditional hand coding, enabling accelerated delivery of business apps. A common benefit is that a wider range of people can contribute to the app's development not only those with formal programming skills. Low-code app development platforms can also lower the initial cost of setup, training, deployment, and maintenance.

With reference to FIG. 1, a functional block diagram of an example computer system or data processing system 100 is depicted that facilitates managing apps 120, such as creating an app 120 including developing a user interface 124 of the app 120. The processing system 100 may include a (visual model-based) app development platform 118 including at least one processor 102 that is configured to execute at least one application software component 106 from a memory 104 accessed by the processor 102. Herein, the app development platform 118 may include the above-described functionalities of visual model-based representations, visual model-based apps, and/or visual models and, by way of example, be a visual model-based app development platform or a low-code app development platform. The application software component 106 may be configured (i.e., programmed) to cause the processor 102 to carry out various acts and functions described herein. For example, the described application software component 106 may include and/or correspond to one or more components of an app development application that is configured to generate and store product data in a data store 108 such as a database. Furthermore, the described application software component 106 may include and/or correspond to one or more components of an app creation or development application.

By way of example, the app development platform 118 may be cloud-based, internet-based, and/or be operated by a provider providing app development and creation support, including e.g., supporting low-code and/or visual model-based app development. The user may be located close to the app development platform 118 or remote to the app development platform 118, e.g., anywhere else, e.g., using a mobile device for connecting to the app development platform 118, e.g., via the internet, wherein the mobile device may include an input device 110 and a display device 112. In some examples, the app development platform 118 may be installed and run on a user's device, such as a computer, laptop, pad, on-premises computing facility, or the like.

Examples of product systems that may be configured to include the app management and/or development, such as for creating an app 120 including developing a user interface 124 of the app 120, features described herein may include the low-code software development platform of Mendix Inc., of Boston, Massachusetts, USA. This platform provides tools to build, test, deploy, iterate, develop, create, and manage apps 120 and is based on visual, model-driven software development. However, it should be appreciated that the systems and methods described herein may be used in other product systems (e.g., product lifecycle management (PLM), product data management (PDM), application lifecycle management (ALM) systems) and/or any other type of system that generates and stores product data in a database. Also, examples of databases that may be used as one or more data stores described herein include database server applications such as Oracle™, Microsoft™ SQL Server, or any other type of data store that is operative to store data records.

It should be appreciated that it can be difficult and time-consuming to manage apps 120, such as creating an app 120 including developing a user interface 124 of the app 120, in complex app development and/or management environments. For example, advanced coding, software or UI development or management knowledge of users may be required, or selections of many options need to be made consciously, each involving many manual steps, which is a long and not efficient process.

To enable the enhanced management apps 120, such as creating an app 120 including developing a user interface 124 of the app 120, the described product system or processing system 100 may include at least one input device 110 and at least one display device 112 (such as a display screen). The described processor 102 may be configured to generate a graphical user interface (GUI) 114 through the display device 112. Such a GUI 114 may include GUI elements such as buttons, links, search boxes, lists, text boxes, images, or scroll bars usable by a user to provide inputs through the input device 110 that cause determining or updating the respective sample app UI **124*s* and/or developing the app 120. By way of example, the GUI 114 may include an app development UI 116 provided to a user for developing the respective sample app UI 124*s* and/or the app 120**.

In an example embodiment, the application software component 106 and/or the processor 102 may be configured to provide an app development user interface (UI) 116 of an app development platform 118 to a user for developing the app 120.

As mentioned above, the app development platform 118 may provide or include the above-described functionalities of the development and the creation of the app 120, such as creating the app 120 including developing a user interface 124 of the app 120. In some examples, the app development platform 118 may support visual model-based representations, visual model-based apps, and/or visual models and, by way of example, may be a visual model-based app development platform or a low-code app development platform. The app development UI 116 may provide an interactive user interface of the app development platform 118 that supports and enables the user to develop the app 120. By way of example, the app 120 may be or include a software program that, on execution, performs specific desired tasks.

The app 120 to be developed may, e.g., be used by an end user for industrial and/or business purposes. An industrial purpose may, e.g., be to use the developed app 120 for analyzing, monitoring, controlling, and/or managing an industrial field device or plant including several such fields devices, wherein the mentioned devices or plants may correspond to a target device 150 which is explained in more detail below. A business purpose may, for example, be to use the developed app 120 for shopping or retail, e.g., to generate or manage customer orders of a hardware or software product.

In some examples, the application software component 106 and/or the processor 102 may further be configured to provide several UI parameters **122*i* characterizing several properties of an app UI 124 of the app 120**.

Herein, the app 120 to be developed may have a user interface, the app UI 124, by which the end user of the developed app 120 may interact with the developed app 120 that may run on the end user's device, e.g., the target device 150. For the above-mentioned industrial purposes, the end user of the developed app 120 may, e.g., be provided with the latest status data of the monitored field device or plant which may be displayed to the end user via the app UI 124. In some examples, the end user of the developed app 120 may input queries or commands via the app UI 124, which may then be transmitted to the connected field device or plant, e.g., to get updated status data or to update control data which is used for controlling the connected field device or plant. In some examples, the app UI 124 may include one or more sub-UIs, which may individually or some of them jointly be used by the end user of the developed app 120 to interact with the developed app 120, e.g., with respect to separate aspects, e.g., for displaying respective status information of respective field devices of the plant in a respective sub-UI, or for displaying status information of the field device or the plant in one sub-UI and for inputting control data to control the field device or the plant in another sub-UI.

The respective UI parameter 122*i* may, in some examples, characterize an individual property or several properties of the app UI 124 of the app 120 to be developed. In further examples, the respective UI parameter 122*i* may characterize an individual property or several properties of one or more of the mentioned sub-UIs of the app UI 124 of the app 120 which is to be developed. As is explained in more detail below, the respective UI parameter 122*i* may, e.g., characterize style, layout, or language properties of the sub-UI(s) or the app UI 124. Hence, changing one or more of the UI parameters 122*i* may, e.g., accordingly change the corresponding property or properties of the sub-UI or of the app UI 124 of the app 120 to be developed, e.g., the style, by way of example from regular style to dark mode style. In some examples, the language displayed in the sub-UI or the app UI 124 of the app 120 to be developed may be changed through one or more of the UI parameters 122*i* from Spanish to English (or any other language or vice versa). In further examples, the style of numerical data displayed in the sub-UI or the app UI 124 of the app 120 to be developed may be changed through one or more of the UI parameters 122*i* from a pie chart to a bar chart or line chart, wherein the numerical data may, e.g., correspond to timeseries data from a connected field device or plant indicating recently measured values of physical quantities, such as temperature, electric current or voltage, etc. In some examples, the layout of the sub-UI or the app UI 124 of the app 120 to be developed may be changed, e.g., from one of the following layout types to another of the following layout types: linear layout, relative layout, frame layout, constraint layout, web layout, and Android table layout (which are among the types of UI layouts in Android), and combinations thereof.

In some examples, the UI parameters 122*i* are provided to the app development platform 118. By way of example, the UI parameters 122*i* may be determined based on textual UI input information and/or graphical UI input information, as is explained in more detail below. Herein, the analysis of the textual UI input information and/or of the graphical UI input information may have been done beforehand to determine the respective UI parameter 122*i*. The UI parameters 122*i* may, e.g., reflect or incorporate certain information relating to user requirements, boundary conditions, etc., with respect to one or more app UIs 124. In some examples, the UI parameters 122*i* may be considered as an initial set of UI parameters 122*i* with which the suggested method of developing or creating of the app 120, such as creating the app 120 including developing the app UI 124, may start.

In further examples, the application software component 106 and/or the processor 102 may further be configured to determine at least one sample app UI 124*s* based on the provided UI parameters 122.

Herein, the respective sample app UI 124*s* may, in some examples, be understood as an example app UI 124, which may be determined to best reflect and fit the provided UI parameters 122*i*. The respective sample (or example) app UI 124*s* may, in further examples, be understood as a probing or a testing app UI 124 that may serve as an intermediate result and/or for illustration purposes on the user's way to develop a final app UI 124. In further examples, several sample app UIs 124*s* may be created as UI design variations reflecting slight variations of one or more of the UI parameters 122*i* or properties of the sample app UI 124*s*. This may help the user developing the app 120 to get an idea in which way the provided sample app UIs 124*s* may be tuned to (potentially) better fit to the user's desired app UI 124. In some examples, UI design variations may be generated in the form of design elements, components, and screen(s). Designs may be generated by the system's algorithms using the UI parameters specified by the designer or user. The designer or user compares and explores the generated design options, inspecting the results based on the original criteria, and optionally adapting the design options if needed.

By way of example, the respective sample app UI 124*s* may be determined or generated using an algorithm using the provided UI parameters 122. In some examples, the determination of the respective sample app UI 124*s* may use a rule-based algorithm, wherein the algorithm may or may not make use of artificial intelligence (AI), such as machine learning or generative AI.

In some simple examples, the respective sample app UI 124*s* may be generated or determined to have one or more of the following (above-mentioned) layout types: linear layout, relative layout, frame layout, constraint layout, web layout, Android table layout, or combinations thereof, wherein the layout type may be characterized by one or more of the provided UI parameters 122. In further examples, based on the provided UI parameters 122, the style of the respective sample app UI 124*s* may be determined to be regular style or dark mode style. By way of example, depending on the provided UI parameters 122, the language displayed in the respective sample app UI 124*s* may be determined to be Spanish or English or any other language. Further, depending on the provided UI parameters 122, e.g., the style of numerical data displayed in the respective sample app UI 124*s* may be determined to be a pie chart, a bar chart or line chart, wherein the numerical data may, e.g., correspond to timeseries data from a connected field device or plant indicating recently measured values of physical quantities, such as temperature, electric current or voltage, etc. In the above simple examples, the determination of the respective sample app UI 124*s* may use a straight-forward rule-based algorithm, e.g., using a one-to-one-correspondence between a certain value of the respective provided UI parameter 122 and the respective property of the respective sample app UI 124*s*, e.g., language UI parameter 122: "1"=English, "2"=Spanish, "3"=etc. Nonetheless, in some examples, more complex AI supported algorithms may be used to determine the respective sample app UI 124*s* using the provided UI parameters 122.

By way of example, the application software component 106 and/or the processor 102 may further be configured to display the respective sample app UI 124*s* to the user via the app development UI 116.

Displaying the respective sample app UI 124*s* to the user via the app development UI 116 may allow the user to experience the look and feel of the determined and displayed sample app UI 124*s*. This allows the user to compare the displayed sample app UI 124*s* with the user's expectations and facilitates the user to fine-tune the respective sample app UI 124*s* to improve how well the respective sample app UI 124*s* matches the user's expectations and the user's desired app UI 124.

In some examples, not only one but several sample app UIs 124*s* may be displayed to the user, wherein the different sample app UIs 124*s* may correspond to UI design variations reflecting slight variations of one or more of the UI parameters 122*i* or properties of the sample app UI 124*s*. This may, in some examples, be particularly helpful to the user developing the app 120 to get an idea in which way the provided sample app UIs 124*s* may be tuned to (potentially) better fit to the user's desired app UI 124.

In some examples, the application software component 106 and/or the processor 102 may further be configured to receive user input 126 indicative of an amendment to at least one of the properties of the sample app UI 124*s* via the app development UI 116.

When the respective sample app UI 124*s* is or has been displayed to the user, the user may provide user input 126, e.g., using the input device 110 and/or the display device 112 that may, e.g., also be a touch screen or the like. By providing user input, the user may express the user's wish of amendments to be made with respect to at least one of the properties of the sample app UI 124*s*. Hence, the user input 126 is provided to tune the respective sample app UI 124*s* to better fit to the user's desired app UI 124. In some examples, the user input 126 may be provided as textual UI input information, e.g., via a text box, via a drop-down list provided in the app development UI 116, or via spoken language which may be recognized by the app development platform 118 and be used as user input. In further examples, the user may provide the user input 126 in form of text documents describing the respective, desired property of the sample app UI 124*s*, or the desired sample app UI 124*s*. In yet further examples, the user input 126 may be provided as graphical UI input information, e.g., by providing pictures, photos, etc. relating to the respective, desired property of the sample app UI 124*s* or the desired sample app UI 124*s*. In some examples, the user may provide the user input 126, e.g., using a drag & drop or other functionality in the app development UI 118 that allows the user to move, change the size, add (e.g., by copying), delete, etc. elements of the respective sample app UI 124*s*, e.g., interactively.

In further examples, the application software component 106 and/or the processor 102 may further be configured to determine amended UI parameters 122*a* using the received user input 126.

Depending on the received user input 126, the determination of the amended UI parameters 122*a* may be done with more or less sophisticated tools or algorithms. In the above simple examples, the determination of the amended UI parameters 122*a* may use an algorithm that is like the above-mentioned straight-forward rule-based algorithm, e.g., using the same one-to-one-correspondence between a certain value of the respective provided UI parameter 122 and the respective property of the respective sample app UI 124*s*. For example, if the user provides user input 126, e.g., via a text box, a drop-down list or spoken language, indicating a change of the language of the app UI 124 from Spanish to English, the corresponding language UI parameter 122 may be determined to change from “2” to “1”. Correspondingly, if the user provides user input 126 indicating a change of the style of the sample app UI 124*s* from regular style to dark mode style, the respective UI parameter 122 relating to the style of the sample app UI 124*s* may be determined to change from “R” for regular style to “D” for dark mode style. In further examples, if the user provides user input 126 indicating a change of the style of numerical data displayed in the sub-UI or the app UI 124 of the app 120 to be developed from a pie chart to a bar chart or line chart, the respective UI parameter 122 relating to the display style of numerical data in the sample app UI 124*s*, may be determined to change from “1” for the pie chart to “2” for the bar chart or to “3” for the line chart. In some examples, if the user provides user input 126 indicating a change of the layout of the sub-UI or the app UI 124 of the app 120 to be developed from one of the following layout types to another of the following layout types, the respective UI parameter 122 relating to the layout of the sub-UI or the app UI 124 may be determined to change accordingly. By way of example, the following values may be attributed to the respective UI parameter 122 relating to the layout of the sub-UI or the app UI 124: “1” to linear layout, “2” to relative layout, “3” to frame layout, “4” to constraint layout, “5” to web layout, and “6” to Android table layout, and combinations thereof with suitably adapted values.

In some examples, more complex, e.g., AI-supported, algorithms may be used to determine the amended UI parameters 122*a* using the received user input 126. Herein, if the received user input 126 includes textual UI input information and/or graphical UI input information, the amended UI parameters 122*a* may be determined using such user input 126 according to the more detailed explanations below.

In some examples, the application software component 106 and/or the processor 102 may further be configured to determine at least one updated sample app UI 124*s*' using the respective, amended UI parameter 122*a*.

By way of example, the determination of the respective updated sample app UI 124*s*' (using the respective, amended UI parameter 122*a*) may be done analogously to the above-explained determination of the respective sample app UI 124*s* (using the provided UI parameters 122). Hence, the provided UI parameters 122 may be replaced with the respective, amended UI parameter 122*a* which may be used as input for the same algorithm to determine the respective (further) sample app UI 124*s*(').

By way of example, the application software component 106 and/or the processor 102 may further be configured to develop the app 120 through the app development UI 116 by using the updated sample app UI 124*s*'.

Using the determined updated sample app UI 124*s*', the app 120 may be developed through the app development UI 116 which may interact, by way of example, with an ADF, IDE, visual model-based representations or the above-mentioned (low-code) app development platform 118 to accomplish the development of the app 120. Herein, the app development platform 118 together with the updated sample app UI 124*s*' may particularly be suitable to support non-expert users to develop and fine-tune their desired app UI 124 and then to develop the app 120 including the updated sample app UI 124*s*' as the app UI 124 of the app 120 to be developed.

In some examples, the application software component 106 and/or the processor 102 may execute the above-described activities in a different sequence than described above.

In further examples, the app development platform 118 may further provide one or more additional functionalities and support to the user to develop the app UI 124 and the app 120, e.g., from design, requirements definition, ideation, evaluation, development, testing to deployment (and even maintenance) of the app UI 124 and/or the app 120. One or more of the earlier steps may be supported by the app development platform 118 by providing a collaborative environment in which several users or stakeholders may drop their input (e.g., with respect to design, requirements, ideas, evaluation of these aspects). For example, provided ideas for the app UI 124 or the app 120 may be clustered, commented, extended, and rated by the different users or stakeholders using the app development platform 118.

In some examples, the respective additional functionality may be provided to the user via a separate software product, e.g., Adobe Photoshop™ of Adobe Inc., of San Jose, California, USA, or via a visual editor which is a computer software for editing text files using a textual or graphical user interface that normally renders the content (text) in accordance with embedded markup code, e.g., HTML (Hypertext Markup Language), Wikitext, rather than displaying the raw text. Hence, in some examples, the app development platform 118 may be understood as a software suite or as an application suite which is a collection of computer programs (such as application software, or programming software) of related functionality, sharing a similar user interface and the ability to easily exchange data with each other. In other examples, the app development platform 118 may be understood as limited to app management or app development only.

In further examples, the respective UI parameter 122 may characterize a functional representation and/or a perceivable representation of at least an app UI element of the app UI 124.

Herein, the respective app UI element may, by way of example, be or include: an accessibility helper, an accordion, an active filter, an activity indicator, an animation, an area chart, an attribute helper, a badge, a bar chart, a barcode scanner, a date picker, a multi select, a calendar, a cancel button, a carousel, a cell styler, a check-box filter, a check-box, a color picker, a column chart, a data grid, a data table, a date, a date filter, a date time field, a date calculator, a date picker, a digital clock, a DIV container or an HTML DIV element, a drop down filter, a drop-down, a dynamic image viewer, a dynamic text, a feedback, a file dropper, a file manager, a gallery, an image, an image viewer, an image uploader, an intro screen, a label, a label selector, a layout grid, a light box, a line, a line chart, a list sorter, a list view, a loader, a login, a map, a menu bar, a microflow timer, a multi select drop-down, a navigation list, a navigation tree, a notification, a number filter, a pagination, a paging, a pie chart, a pop-up menu, a progress bar, a progress circle, a pusher listen, a QR code, a radio button, a range slider, a rating, a read only, a rich text, a rich text viewer, a searchable selector, a signature, a simple chart, a simple list, a slide out, a slide out context, a slider, a star rating, a static image, a switch, a tab name, a tab switcher, a table, a tag selector, a template grid, a text box search, a text filter, a text box, a thumb, a time input, a time line, a toggle button, a tooltip, a tree node, a tree view, a tree table, a video player, a web view, or any combination thereof. Further, by way of example, two or more of the mentioned app UI elements may be combined to form a respective app UI component. In some examples, the app UI 124 may include one or more app UI elements and/or one or more app UI components.

In further examples, the respective UI parameter 122 may characterize a functional representation of the one or more app UI elements and/or one or more app UI components. Herein, the functional representation may, e.g., describe a function of the respective app UI element or component, e.g., what functionality is triggered upon a given user input 126 relating to the respective app UI element or component. The functional representation of a drop-down list (short: drop-down) may, e.g., be to provide a list of selectable items to the user, receive a selection by the user, and use the selected items as input. In some examples, the functional representation of a radio button may be similar in that it is a graphical control element that allows the user to choose only one of a predefined set of mutually exclusive options.

By way of example, the respective UI parameter 122 may characterize a perceivable representation of at least an app UI element of the app UI 124, wherein the perceivable representation may include the visual representation, but in a broader sense also the audible, haptic, or even olfactory or gustation representation, e.g., linking the respective app UI element to a sound, to a touch, or even to a smell or taste. Further, a multi-modally perceivable representation may, in some examples, be conceivable if more than one sensory modality is concerned, e.g., a visual representation together with an audible representation, e.g., such that the respective app UI element may be visible and (by activating it) audible to the app end user. In other examples, the haptic representation may be useful in the context of blind app users, e.g., to communicate information from/to the app end user using a tactile alphabet. In further examples, the haptic representation may be useful in the context of operators of the target device 150 which may, e.g., be a CNC lathe, wherein the haptic aspect of the respective app UI element may be used as a warning to the app end user if the target device 150 might be operated in a critical operation mode. By way of example, the haptic representation may also be used for an alarm or an alarm clock, e.g., if the target device 150 includes or is a smartphone.

The visual representation may include, e.g., at least a visual appearance, a layout, a position, a size, a theme, a style, a styling, a font style, a color palette, a spacing, a border style, an iconography, a button design, an image effect, an animation, a motion, a design, a layout, an input element style, or any combination thereof, with respect to the app UI or, if applicable, with respect to the respective app UI element or the respective app UI component. By way of example, the language used in the respective app UI element may be considered to be included in the visual representation of the respective app UI element.

In some examples, the respective app UI element or the respective app UI component may be provided in the data store 108 before executing the suggested method and/or may be provided through the mentioned textual or graphical UI input information.

By way of example, the determined respective sample app UI 124*s* may include at least one novel functional representation and/or perceivable representation of at least an app UI element of the app UI 124.

By way of example, the novel functional representation and/or perceivable representation of the respective app UI element may not yet be available in the data store 108 and may not yet be known directly from the mentioned textual or graphical UI input information or the user input 126. In further examples, the novel functional representation and/or perceivable representation of the respective app UI element may, for the first time, be created or determined according to the suggested method by determining corresponding UI parameters 122 and then using these UI parameters 122 to determine the corresponding, respective sample app UI 124.

Determining at least one novel functional representation and/or perceivable representation of at least an app UI element of the app UI 124 may, e.g., be enabled by the suggested method by combining a functional representation and/or a perceivable representation of one or more app UI elements in a novel way. This may include rather simple examples, e.g., changing the language or the regular/stark mode of a known app UI element or adding a haptic or audio functionality to a known app UI element which did not have this functionality yet. More complex examples may also be conceivable, e.g., combining three or more known properties of different app UI elements in a new way.

In some examples, for determining the respective UI parameters 122, the application software component 106 and/or the processor 102 may further be configured to: firstly, determine a first UI parameter set among the UI parameters 122 using a first algorithm; secondly, determine a second UI parameter set among the UI parameters 122 using a second algorithm; and thirdly, determine a third UI parameter set among the UI parameters 122 using a third algorithm, wherein the first, the second, and the third UI parameter set characterize different visual and/or functional aspects of the respective sample app UI 124*s*.

By way of example, first rather "rough" perceivable (e.g., visual) and/or functional aspects of the respective sample app UI 124*s* may be determined, such as the generic layout of the respective sample app UI 124*s*, using a suitable first algorithm. The generic layout may, e.g., be as simple as determining how many boxes are required and where they are situated in the respective sample app UI 124*s*. Next, when the corresponding first UI parameter set has been determined, more advanced perceivable (e.g., visual) and/or functional aspects of the respective sample app UI 124*s* may be determined, such as the specification of the functionality of the individual boxes of the respective sample app UI 124*s*, using a suitable second algorithm. The functionality of the individual boxes may, e.g., include one box for displaying status data of a field device or plant connected to the target device 150, and one box for receiving input of the app end user, etc. Next, when the corresponding second UI parameter set has been determined, more detailed perceivable (e.g., visual) and/or functional aspects of the respective sample app UI 124*s* may be determined, such as the determination of animations, of dark mode/regular mode, of language, etc., by determining the corresponding third UI parameter set.

In another example, the textual and or graphical UI input data or the user input 126 may include visual input data, such as photos, images, or graphic data, e.g., from HMTL or URL locations. By way of example, the user may provide input, e.g., a query, on what aspect(s) the user wishes to recognize or reuse for the app UI development in this input data. An algorithm may first be applied to the input of the user to interpret the user query and to find out what the user desires to recognize or reuse in this input data. Then, another algorithm may be used to analyze this input data and find data sets in this input data that match the user query. In some examples, this other algorithm may include the above-mentioned three algorithms to determine the UI parameters 122.

By way of example, wherein the UI parameters 122 may include at least one weighting UI parameter which assigns a respective weighting factor to at least two of the other UI parameters 122, wherein the respective weighting UI parameter may be used during the determination of the respective sample app UI 124*s*.

The respective weighting UI parameter may, e.g., be used to put a focus or emphasis on one or more of the other UI parameters 122 characterizing several properties of the app UI 124. By way of example, the user may have a strong preference for app UI 124 in dark mode style. Then, a weighting UI parameter with a weighting factor larger than 1, e.g., 2, may be assigned to the UI parameter 122 corresponding to the dark mode style of the app UI 124. In this example, the determined respective sample app UI 124 may use the dark mode style, e.g., although other input data or other UI parameters 122 may rather indicate the use of the regular mode style for the sample app UI 124. In other examples, the respective weighting UI parameter and the weighting factor may reflect a focus on a respective perceivable (e.g., visual) and/or functional aspect of the respective sample app UI 124*s*, e.g., the use of rather large boxes for display and input and accordingly fewer boxes in the respective sample app UI 124*s*, or the use of drop-down lists instead of text input boxes to provide a tighter guidance of the app user.

In further examples, the mentioned algorithms (potentially including a trained function which is explained below) may be used and be suitable for the follow purposes: for structure recognition from pixel images/raster graphics; for styling information recognition from images/videos; for textual input recognition (existing models can be used as is or fine-tuned for specific UI purposes); for optimization criteria extraction from different inputs; and/or for generating the score for the correspondence of a layout and styling (and possibly building blocks mapping) to user criteria.

By way of example, the respective weighting UI parameter and the weighting factor may be determined using the user input 126. In some examples, several of such weighting UI parameters may be used reflecting different focus properties of the app UI 124 desired by the user.

In some examples, during the determination of the respective UI parameters 122, the type of the app 120 and/or the type of the respective target device 150 of the app 120 may be used.

By way of example, the different types of the app 120 may relate to a corresponding properties of the corresponding app UI 124, which may be reflected in corresponding UI parameters 122: an analytical and sober layout with corresponding UI elements that may be used for monitoring or control apps in an industrial environment, fancy animations, or glamorous UI elements for shopping apps, a neutral layout with national emblems as UI elements for apps of public authorities, high-res UI elements and animations for video gaming apps, a sincere and reputable layout and look and feel for banking apps, flickering UI elements to attract the app end user's attention for social networking apps, etc. The corresponding properties may be determined according to the type of the app 120, e.g., by analyzing corresponding user input 126.

In an example embodiment, the app 120 may be deployed on a respective target device 150. In some examples, the respective target device 150 may be physically connected or communicatively connected to another device or connected such, that the respective target device 150 may at least detect input data from the other device, e.g., by optically inspecting the other device. The respective target device 150 and/or the other device may be or include a sensor, an actuator, (such as an electric motor, a valve, or a robot), an inverter supplying an electric motor, a gear box, a programmable logic controller (PLC), a communication gateway, and/or other parts or components relating to industrial automation products and industrial automation in general. The respective target device 150 may be part of a complex production line or production plant, e.g., a bottle filing machine, conveyor, welding machine, welding robot, etc. In some examples, if the other device belongs to a lower level of the automation pyramid, such as the sensor/actuator or the field level, then the respective target device 150 may belong to a higher level of the automation pyramid, such as field level or the control level.

Further, the app 120 may be understood as deployed if the activities which are required to make this app 120 available for use by the app end user on the respective target device 150 are completed. The app deployment process may include several interrelated activities with possible transitions between them. These activities may occur at the producer side, (e.g., by the app developer), at the consumer side (e.g., by the app user or end user), or both at the producer side and at the consumer side. In some examples, the app deployment process may include at least the release of the app 120 and the installation and the activation of the app 120. The release activity may follow from the completed development process and may be classified as part of the development process rather than deployment process. It may include operations required to prepare a system (here: e.g., the app development platform 118 or an on-line app store) for assembly and transfer to the computer system(s) (here: e.g., the respective target device 150) on which it will be run in production. Therefore, it may sometimes involve determining the resources required for the system to operate with tolerable performance and planning and/or documenting subsequent activities of the deployment process. For simple systems, the installation of the app 120 may involve establishing some form of command, shortcut, script, or service for executing the software (manually or automatically) of the app 120. For complex systems, it may involve configuration of the system, (e.g., by asking the end user questions about the intended app use, or directly asking them how they would like it to be configured), and/or making all the required subsystems ready to use. Activation may be the activity of starting up the executable component of software or the app 120 for the first time (which is not to be confused with the common use of the term activation concerning a software license, which is a function of Digital Rights Management systems).

Herein, using the type of the respective target device 150 of the app 120 may, in some examples, mean to adapt the UI parameters 122 and hence the sample app UI 124 to the available computation, network, display, and/or memory resources of the respective target device 150 on which the app 120 shall eventually be deployed and run. This may, e.g., help to make sure that the app 120 may still be operated or run with tolerable performance on the target device 150. By way of example, if the respective target device 150 is a CNC machine with a low-cost display, no high-res UI elements should be used in the app UI 124 that may be reflected by the corresponding UI parameter 122. In another example, if the respective target device 150 is a PLC controlling a critical manufacturing process or a train, the app UI 124 may be optimized with respect to performance and availability of the respective target device 150 so that no fancy, high-res, or flickering animations should be used in the app UI 124, which may accordingly be reflected by the corresponding UI parameter 122.

By way of example, for providing several UI parameters **122*i* characterizing several properties of the app UI 124 of the app 120, the application software component 106 and/or the processor 102 may further be configured to provide textual UI input information, and to determine at least one of the UI parameters 122*i*** from the provided textual UI input information using a trained function, wherein the trained function optionally uses a large language model or a generative model.

In some examples, the textual UI input information may be provided in the form of regular text documents, HTML, CSS (Cascading Style Sheets), a URL (Uniform Resource Locator, colloquially known as an address on the Web, a reference to a resource that specifies its location on a computer network and a mechanism for retrieving it), or other apps.

To analyze the textual UI input information, e.g., a crawler (sometimes called web crawler, spider or spiderbot), e.g., an internet bot that systematically browses the World Wide Web and that may be operated by search engines for the purpose of Web indexing (web spidering) may be used. There exists a large variety of crawlers including among many others the World Wide Web Worm, Bingbot, Googlebot, WebCrawler, GNU Wget. Herein, a crawler may use AI, i.e., a trained function, e.g., further using machine learning (ML). In some examples, the crawler may use a large language model (LLM), i.e., a language model characterized by its large size. Its size is enabled by AI accelerators, which are able to process vast amounts of text data, mostly scraped from the Internet. LLMs are artificial neural networks that can contain a billion to a trillion weights and are (pre-) trained using self-supervised learning and semi-supervised learning. GPT-4 is an example of such an LLM. In other examples, the crawler may use a generative model relating to generative AI (also called GenAI) which is AI capable of generating text, images, or other media, using such a generative models. Generative AI models may, e.g., learn the patterns and structure of their input training data and then generate new data that has similar characteristics. Examples of such generative models or GenAI include text-to-image AI art systems such as Stable Diffusion, Midjourney, and DALL-E.

In some examples, the mentioned trained function may be trained before applying it to the provided textual UI input information. The textual UI input information and/or the trained function may, e.g., be provided in the data store 108.

In some examples, for providing several UI parameters **122*i* characterizing several properties of an app UI 124 of the app 120, the application software component 106 and/or the processor 102 may further be configured to provide graphical UI input information, and to determine at least one of the UI parameters 122*i*** from the provided graphical UI input information using a computer vision algorithm.

In some examples, the graphical UI input information may be provided in the form of images, photos, pictures, graphics, videos, or links to such documents, e.g., a URL.

To analyze the graphical UI input information, e.g., a computer vision algorithm may be used. Such computer vision algorithms may acquire, process, analyze, and understand digital images, and extract high-dimensional data from the real world in order to produce numerical or symbolic information, e.g., in the forms of decisions. A large variety of such computer vision algorithms are available for various purposes, e.g., including optical character recognition (OCR).

In some examples, the mentioned computer vision algorithm may be trained before applying it to the provided graphical UI input information. The graphical UI input information and/or the computer vision algorithm may, e.g., be provided in the data store 108.

Examples of such computer vision algorithms may include OpenCV (Open Source Computer Vision Library), which is a library of programming functions mainly used for real-time computer vision, machine learning, and image processing. Further, computer vision algorithms may include object detection algorithms which may be used to detect objects in images or videos. Examples of object detection algorithms include YOLO, SSD, and RetinaNet. In some examples, computer vision algorithms include feature detection algorithms which may be used to detect features in images, such as edges, corners, and blobs. Examples of feature detection algorithms include Harris corner detection, SIFT (Scale-Invariant Feature Transform), SURF (Speeded Up Robust Features). Further, the histogram of oriented gradients (HOG) is a feature descriptor which may be used in computer vision for object detection. Also, GPT-4, a multimodal language model, may process both text and image inputs. It can analyze the contents of an image and connect that information with a written question, and it can extract relevant information from images to provide structured answers. GPT-4 may also recognize certain individuals in images. Although GPT-4 may not strictly be considered to be a computer vision model and does not inherently process images like a computer vision model, GPT-4 can, e.g., be used in conjunction with computer vision models to extract relevant information that GPT-4 or the computer vision algorithm can then provide it with its responses.

By way of example, the provided several UI parameters 122*i* characterizing several properties of an app UI 124 of the app 120 may include at least several UI parameters 122 characterizing several properties of the app UI 124 of the app 120 at an earlier development stage, and/or several UI parameters characterizing several properties of an app UI of a different app.

In some examples, several UI parameters 122 characterizing several properties of the app UI 124 of the app 120 at an earlier development stage, and/or several UI parameters characterizing several properties of an app UI of a different app may be stored in the data store 108, respectively. Herein, in some examples, the UI parameters characterizing several properties of an app UI of a different app may also be stored in the data store 108 throughout the development process of the different app.

The mentioned, respective UI parameters 122 may serve as a knowledge base to the user, wherein the respective UI parameters 122 of earlier development stage or the respective UI parameters of the different app may provide additional ideas and inspiration to the user desiring to create or determine a new UI 124.

In this context, the respective sample app UI 124*s* and the corresponding UI parameters 122 may be stored at each development stage in the data store 108 to create the mentioned knowledge base.

In further examples, the user input 126 indicative of the amendment may be received via user interaction with at least one interactive UI element 128 displayed to the user via the app development UI 116, wherein the respective interactive UI element 128 may include a button, a mixer, a text box, e.g., to enable language interactions or to interact with a chatbot.

The user may, in some examples, provide the user input 126 via the respective, interactive UI element 128. The user may then interact with the respective, interactive UI element 128, e.g., to fine-tune the displayed sample app UI 124(*s*), e.g., by activating buttons or mixers for amending some of the properties of the displayed sample app UI 124, or by inputting text characterizing the user's desired amendments to the displayed sample app UI 124. By way of example, the respective, interactive UI element 128 may be used for tuning the UI design variations reflecting slight variations of one or more of the UI parameters 122*i* or properties of the sample app UI 124*s*. In further examples, the respective, interactive UI element 128 may include a text box for which the user may chat with a chatbot, wherein the chatbot tries to get the user's input on amendments to the displayed sample app UI 124 desired by the user.

In some examples, the application software component 106 and/or the processor 102 may further be configured to iterate the following steps at least once: to display the at least one updated sample app UI 124*s* to the user via the app development UI 116; to receive user input 126 indicative of an amendment to at least one of the properties of the updated sample app UI 124*s* via the app development UI 116; to determine the respective amended UI parameters 122*a* using the received user input 126; and to determine the at least one updated sample app UI 124*s*' using the respective, amended UI parameter 122*a*, wherein the app 120 is developed through the app development UI 116 by using the last, updated sample app UI 124*s*'.

The suggested iteration process may mean that the sequence of displaying the respective sample app UI 124*s*, receiving user input 126 indicating desired amendments to the respective, displayed sample app UI 124*s*, determining corresponding, respective amended UI parameters 122*a*, and determining the respective updated sample app UI 124*s*' using the most recent user input 126, may be repeated by the app development platform 118 once or several times. Hence, the suggested iteration process may help to further improve the respective sample app UI 124*s* and help to better match the app UI 124 desired by the user.

In some examples, the suggested iteration process may be stopped if the amendment of the respective UI parameters 122 from the penultimate iteration to the most recent iteration is smaller than a given threshold.

In further examples, the application software component 106 and/or the processor 102 may further be configured to perform the following steps in real-time or at least in near real-time: to receive user input 126 indicative of an amendment to at least one of the properties of the sample app UI 124*s* via the app development UI 116; to determine the respective amended UI parameters 122*a* using the received user input 126; to determine the at least one updated sample app UI 124*s*' using the respective, amended UI parameter; and to display the at least one updated sample app UI 124*s*' to the user via the app development UI 116.

The suggested feedback sequence of receiving user input 126 indicating desired amendments to the respective, displayed sample app UI 124*s*; determining corresponding, respective amended UI parameters 122*a*; determining the respective updated sample app UI 124*s*' using the most recent user input 126; and displaying the respective updated app UI 124*s* may, in some examples, be executed by the app development platform 118 in real-time or at least in near real-time. Hence, the suggested feedback sequence may, in some examples, provide a particularly convenient and interactive user experience to the user creating or developing the app UI 124 and/or the app 120. This may be enabled, e.g., by avoiding lengthy waiting times until the user is provided with the respective updated sample app UI 124*s* which uses the user's latest user input 126. Further, the complete process of creating or developing the app UI 124 and/or the app 120 may be accelerated and may be made much more convenient to the user. In some examples, real-time may mean less than a 100 ms, less than one second, or less than two seconds. In further examples, near real-time may mean more than real-time but less than one to five seconds.

In some examples, the app development platform 118 may be distributed between a central (cloud) part and user-specific instance, e.g., on the user's premises (as is explained in more detail below). In this context and in further examples, the overall algorithm for the determination of the respective UI parameter 122 or the sample app UI 124 may include several (e.g., separated) sub-algorithms, e.g., the above-mentioned first, second, and third algorithm. These sub-algorithms as well as optionally a central algorithm may, e.g., be developed and trained individually and independently which may, by way of example, allow that the respective (sub-)algorithm may be cloned also individually within the overall algorithm clone on the local instance, e.g., for the performance optimization purposes.

It should be appreciated that the described the application software component 106 and/or the processor 102 may carry out an analogous method of developing and creating such apps 120, such as creating an app 120 including developing a user interface 124 of the app 120.

Further, a computer-readable medium 160 that may include a computer program product 162 is shown in FIG. 1, wherein the computer program product 162 may be encoded with executable instructions, that when executed, cause the computer system 100 or and/or the app development platform 118 to carry out the described method.

It should be appreciated that it is the ambition of the present disclosure to accelerate the customer's digital transformation.

The disclosure tackles the following problem: How to teach a machine to generate a user interface (UI) in design and code based on user's wishes in form of images, texts and/or language? How can the machine generate user interfaces that are of high perceptual and cognitive quality and are compliant with UI standards, policies, and rules? The machine-generated and optimized results should be able to be configured for different modalities, usage scenarios, and device form factors, understanding screen semantics for layout and accessibility, task automation, information extraction, and in assisting interface design.

Why is this a problem? Customers and in-house developers are under pressure to transform and to deliver digital solutions at a higher pace (need for speed). Factors like cost pressure, increased flexibility (efficiencies) on the one hand, as well as the quality of products and the demand for high user satisfaction (higher quality) on the other hand continue to intensify, while the technological pace increases, and faster innovation cycles accelerate (competition). This has a strong effect on the enterprise's software development as talent is scarce (lack of experts). As enterprises strive for strong user experiences, front-end and experience design effort is making up a substantial part of the invested time during software development, there seem to be no technological solutions to automate and support creativity and frontend delivery in this field. This domain can be strongly supported by exploring new front-end technologies and developing approaches to enable design like the above.

Why this disclosure? Among others, the disclosure may aim to allow simultaneous exploration, validation, and comparison of dozens of design solutions through generative approaches like algorithmic logic and optimizers. User input may be analyzed, computed, and understood; designs may be created and generated by the system using algorithms; and parameters specified by the designer. The system may allow to adapt the user interface accommodating users' goals to find the optimum design and refine it.

Companies providing SW applications and services may have the following needs: want to create or adapt existing UI for those applications fast; would like to apply best practices from the relevant user sectors; want to have several options of UI to be able to evaluate which ones fit better for which platform and user group; want consistent UI for their applications on different platforms to promote the company branding; and/or want to sustain a high standard for the user experience associated with their applications, as well as comply with the org. standards.

Their current pain points include: do not have enough technically skilled personal for the creation of software solutions (UI); also need to prototype or deliver high quality applications timely in short periods to stay competitive on a very fast paced market; need to have best in class software solutions; and/or need to consider future trends in the applications & UI development and the possibility for future fast adaptation.

Business challenges for such organizations include: Talent—Developer talent is scarce and needs development; Novelty—Keep up with the pace of new technological practices; Hyper-automation—Time to deliver software solutions; Integration—Use and build upon existing assets and solutions in an organization; and/or Standards—Keep up with expected quality and standards.

Technological challenges during the UI development include: increasing demands and standards of user/customer needs; a lot of options and touchpoints for UI design; different technologies and formats (css, text, images, etc.); needs for individual customization and org standards (incl. accessibility requirements); platforms & tools landscape changing, needs for consistent & adaptable UI design; repetition and mundane tasks; lack of technical staff for the realization and adaptation; and/or pessimistic trends.

According to other approaches, the problems described may be solved through manual labor between designers and front-end developers, between design tools, and through manual reviews. Nevertheless, rising vendors may be trying to solve some of the tasks described, but never the entire problem.

The suggested approach may, e.g., be defined via the following main components:

(Optionally:) Input Recognition: Translating the human design goal in the form of visual and textual inputs (e.g., screenshots, images, sketches, files from design tools) into machine readable artefacts. Understanding and translating the existing design work and decisions into a new development tool may be a repetitive task. Capturing the designer intents and inputs in visual form is the basic layer for any assistive work. This may, e.g., enable scale for the entire enterprise, business units or touchpoints.

UI Generation: Generating UI design variations in the form of design elements, components, and screen(s) (i.e., sample app UIs). Designs may be generated by the system's algorithms using the parameters specified by the designer. The designer may compare and explore the generated design options, inspecting the results based on their original criteria.

Parametric manipulation: Manipulating the design through parameters (i.e., the UI parameters) and rendering it optionally in real time. Either it is seen in the tooling or in a bug report. This gap between design and final development may be closed. The complexity lays in the movement from wireframes to components, to screen compositions and handing them over to development without realizing how they will be rendered in the end. Realtime component design might help.

The disclosure may, e.g., help app designers and frontend developers to create user interfaces (UI) effective and efficiently by: providing the natural communication with developers, extracting structural information from the unstructured user inputs; allowing to input mass requirements & constraints from existing assets like styling guides, templates, other sources of best practices; generating several UI design options with automatic evaluation based on user criteria (incl. parameters), allow exploration of multiple variations; and/or visualizing the generated results and allowing further manipulation of the parameters.

The main advantages and deliverables provided by suggested app development platform 118 and the suggested method include: (1) collection of "best practices" in form of structured data with layout structure, styling information, criteria definition (examples: color combination or contrast harmony, usability, efficient element allocation, UI for sales/marketing/education/etc., UI for students/school children/pensioner/ . . . ); (2) collection and creation of the training sets to improve the recognition algorithms for visual and textual inputs; (3) trained neural network for the language and visuals recognition; (4) extraction of the quality criteria from the user's textual inputs as prompts and their usage for the evaluation of the generated solutions (a score can be calculated reflecting to which extent the solution corresponds to the criteria). (One way to extract such criteria can be the usage of the text-to-text generative AI like chatGPT to accelerate and simplify this step); (5) handling extended and complex combined UI constraints in an effective way (batch upload), that reduces the user interaction and frustration during the UI generation while still allowing fine tuning the generation; (6) layout generator and building blocks mapping algorithm that will be trained and updated continuously with new input data; (7) definition of the score calculation for the result evaluation and optimization; (8) selection of the instructions and limitations for the UI manipulation within the result visualization; and/or (9) integration with user specific developer tools.

The combination of the UI Copilot's features defined within the list of the individual advantages and deliverables above may constitute, in some examples, the core of the current disclosure and its uniqueness.

This disclosure may, e.g., result in the following benefits: reduced complexity and time to deliver SW; increased quality of the UI output; increased end user satisfaction; democratized SW development; and/or smarter and sustainable work.

Figure 2:
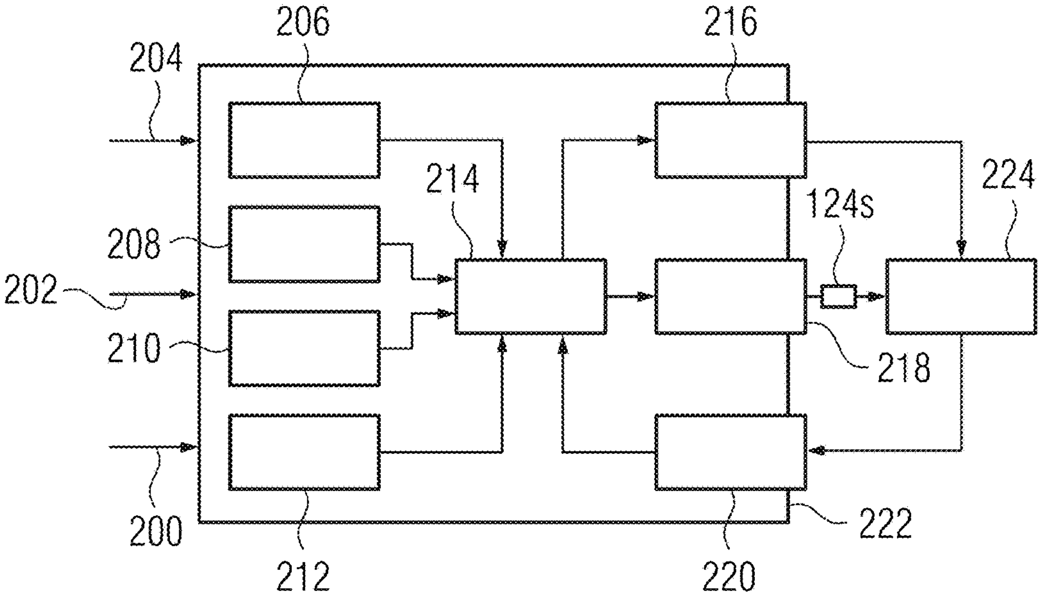

FIG. 2 depicts a functional block diagram of another example system that facilitates managing an app 120 in a product system 100, 118. In particular, the main components for the following functionalities are depicts in FIG. 2.

A UI copilot 222 (e.g., a software application implementing some of the features of the suggested app development platform 118 or the suggested method) may receive a text description 200, images 202, and/or a constraints description 204 as input information. The UI copilot 222 may include a Constraints Analyzer 206, a UI Component Recognizer 208, a UI Style Recognizer, and a Language Interface 212, which process and analyze the mentioned input information and provide their output to a UI Layout Generator 214 that is also included by the UI Copilot 222. The UI Layout Generator 214 may process and analyze the received information and provide its output to a UI Layout Visualizer 216, and a UI Layout Exporter 218, which are also included by the UI Copilot 222, respectively. Further, the UI Layout Visualizer 216 and the UI Layout Exporter 218 may visualize and export the information received from the UI Layout Generator 214 to an Application Development Environment 224, e.g., the UI parameters or the corresponding sample app UI 214*s*. Application Development Environment 224 may provide UI parameters or the corresponding sample app UI 214*s* of the same app (e.g., including at different development stages) or of one or more different apps (e.g., including at different development stages) to a UI Component Library 220 (which may correspond to the data store 108), where they may be stored. Herein, the UI Layout Visualizer 216, the UI Layout Exporter 218, and the UI Component Library 220 may be included by the UI Copilot 222. In some examples, the above- and below-described app development platform 118 may include one or more features of the UI Copilot 222 and the Application Development Environment 224.

The main UI Copilot 222 components may, e.g., include the following functionalities:

UI Component Recognizer 208 may extract elements from the graphical user inputs 202: applying machine learning trained over the collection of images with different UI examples (like screenshots of web sites using their html as labeling information). A screenshot of a "best practice" web site may be uploaded together with its URL: the received HTML file as response to this URL may contain different textual descriptions 200, either within the site contents, or as values of the meta data. These descriptions 200 are used as labels for the screenshot image to train the component recognition neural network within the UI Component Recognizer algorithm 208.

UI Style Recognizer 210 may extract styling information from the graphical user inputs 202 (like colors of the structural elements, background, size of the elements or their labels).

Constraint Analyzer 206 may collect the information from the further assets: import and analysis of different formats (like CSS scrawler, HTML/XML/JSON parser). A user may simply provide the URL of the web site that is recognized as an example of best practices. The response to this URL invocation is an HTML file with further links to other data (to CSS, images, other media), that may be collected by this component. It extends the information about the possible styling and structural elements that may be used during the automatic UI generation. Such data can define additional limitations on the UI elements usage during the generation (their size, coloring, contrast, font type & size, position). This allows implicit specification of user wishes without the need for the user to name and list all constraint details that can be standards for specific purpose, still providing enough information for the UI generator 214.

Language Interface 212 may be a conversational UI to allow user natural communication with NLP technology applied for the intent recognition from the user and criteria recognition that will be used for the solution evaluation during the UI generation.

UI Layout Generator 214 may apply generative design technology to create iteratively different layouts out of UI elements recognized by the UI Component Recognizer 208 and by the Constraints Analyzer 206. It applies styling as it may be defined by the UI Style Recognizer 210 and extracted from other styling data by the Constraints Analyzer 206 and may calculate the probability score reflecting how much the user given criteria are met by the generated solution. This component creates iteratively new layouts following the rules of evolutionary algorithms with the target to obtain new layouts with the higher scores for the correspondence to the user criteria.

UI Layout Visualizer 216 may be used for graphical output of the generated results to allow further exploration, validation, selection, and manipulation by the user. This gives the user more control over the final results. The user may fine-tune the finally selected layout by providing further prompts over the Language Interface 212 or manually manipulating the elements within the layout.

UI Component Library 220 (e.g., implemented in the data store 108) may be an optional component of the UI Copilot 222 that gets a list of tool specific structural elements together with their properties (like UI widgets) and may map them to the UI elements from the generated layouts. So, the UI Layout Generator 214 may expose results as allocation and styling information related to these elements from the tool specific library 220. Such tool specific layouts can be then exported directly to the tool specific format.

UI Layout Exporter 218 may provide a connection to other tools via the integration with SW development tools. This is a useful feature to get UI automatically constructed in those tools.

Figure 3:
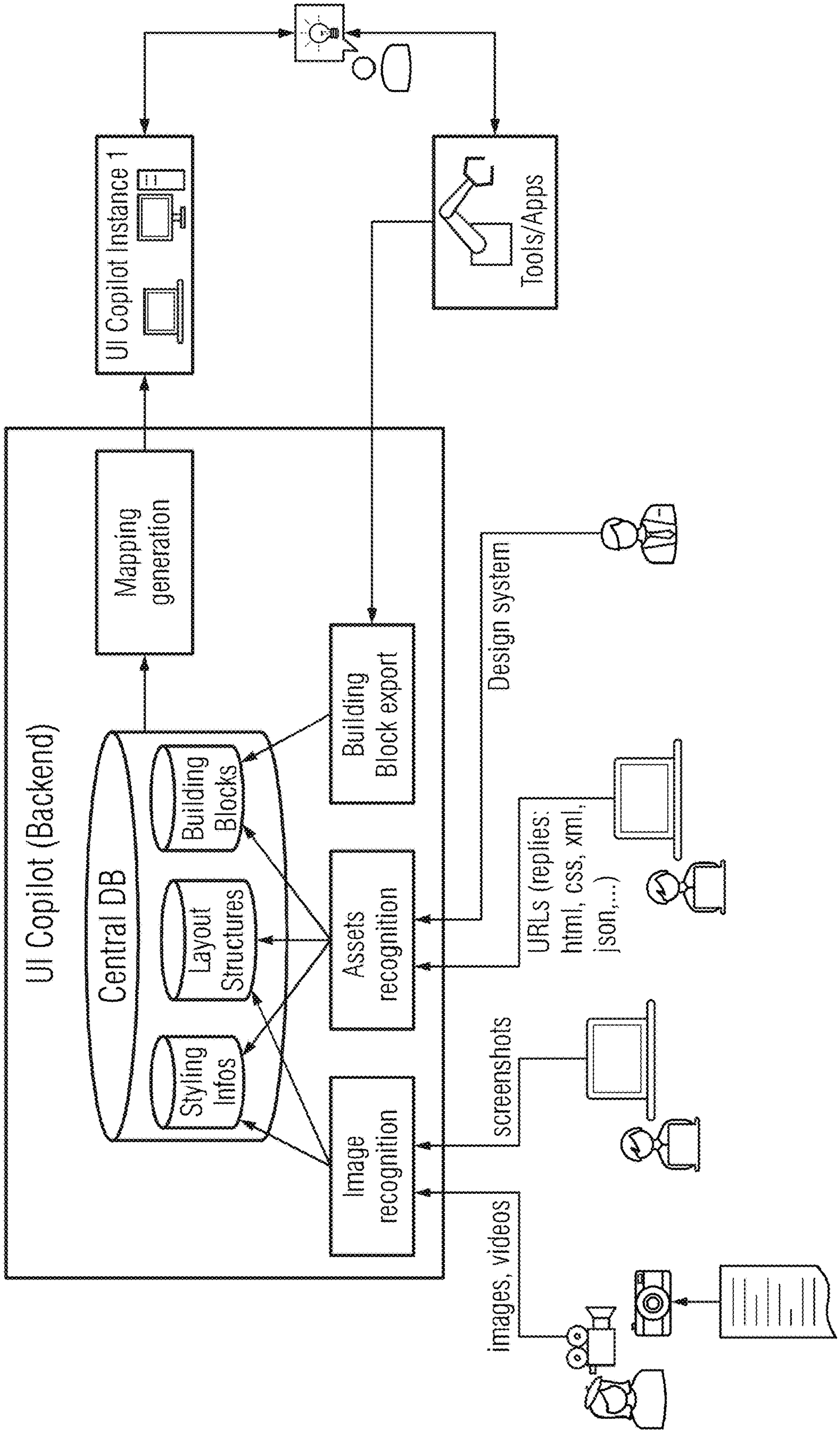

FIG. 3 depicts a functional block diagram of a further example system that facilitates managing an app 120 in a product system 100, 118. In particular, the main flows of external data into the UI Copilot 222 are depicted in FIG. 3. The data may have different nature and formats, they may be structured (HTML, XML, CSS, JSON, . . . ) or unstructured (pixel images, like screenshots, photographs). After their processing by different components that run in parallel, they may be stored in the structural formats in the three types of databases (which may all be stored in the data store 108): structural information, styling information, (tool specific) building blocks. These three databases may be extended at any time independently from each other by obtaining new data, for example, from other team members, like designer/manager providing data with design system for company specific styling (used for company identity). These three types of data bases may be used then by the UI generation algorithm, contained within the UI Layout Generator component delivered within each UI Copilot instance on premises of the end user, which is integrated with the development tool of the user choice.

Figure 4:
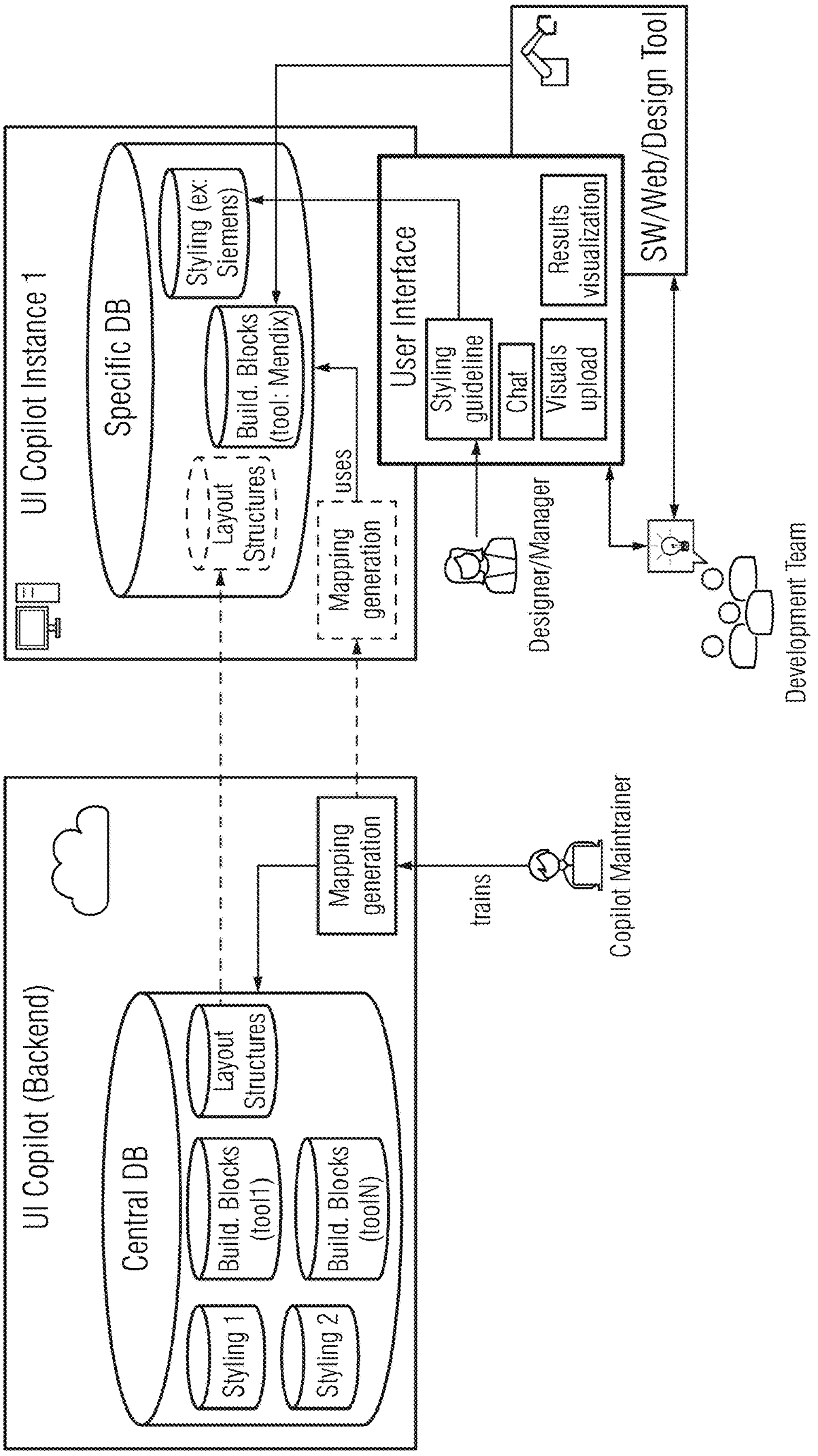

FIG. 4 depicts a functional block diagram of a further example system that facilitates managing an app 120 in a product system 100, 118. In particular, FIG. 4 depicts a possible distribution of the UI Copilot system 222 over its central (cloud) part and user specific instances on user's premises.

The central (cloud) backend may contain the large data base with the maximal collection of different data (possible layout best practice structures and styling, as well as possible building blocks from the development tools) and constantly being updated generator algorithm that is trained on all data collected so far for ever better and faster layout generation results and better mapping to the possible building blocks that could be requested by the users. The database may be organized in a segmented manner, which may allow its partial upload to the individual instances. The data scientist, who maintains and trains the generation & mapping algorithm on the cloud, may collect new data sets and may train the following neural networks that constitute the main generation & optimization & mapping algorithm: Network for structure recognition from pixel images/raster graphics; Network for styling information recognition from images/videos; Network for textual input recognition (existing models can be used as is or fine-tuned for specific UI purposes); Network for optimization criteria extraction from different inputs; and/or Network generating the score for the correspondence of a layout+styling (+possibly building blocks mapping) to user criteria.

Each individual application development team may install an instance of the UI Copilot on their premises connecting the data base of the best practices to the corresponding one from the central (cloud) backend and using the clone of the generation algorithm from the central UI Copilot backend, updated automatically and regularly. This team may upload their data with styling information only relevant for their company (or for their customers for whom they develop applications or SW services), like their company's design system. The user interface of this local UI Copilot instance (instance frontend) may be installed to be integrated into the development tool used by this team (e.g., Mendix). For example, the development tool may have one more UI element within it, "UI Copilot," which may open an additional window with the local UI Copilot frontend, where the team members may chat with the local UI Copilot, upload their own specific graphical examples, and extend the styling information with their own additional assets. The library with the tool specific building blocks may be uploaded automatically from the current development tool to the local instance database (during the installation of the local instance of the UI Copilot on the team's premises). The local generation algorithm clone may run on the local UI Copilot instance being connected only to the local instance database, which may be much smaller than the central (cloud) one. It may only consider local styling constraints and mapping to the concrete tool building blocks. This may serve to increase the effectiveness of the local execution of the (globally trained) algorithm. For better effectiveness, also the local database with default best practices in form of collection of layout structures may be also reduced to few topics relevant for the current development.

Because the main UI generation algorithm may include several separated neural networks, developed, and trained individually and independently, they may be cloned also individually within the generator algorithm clone on the local Copilot instance, for the performance optimization purpose.

Figure 5:
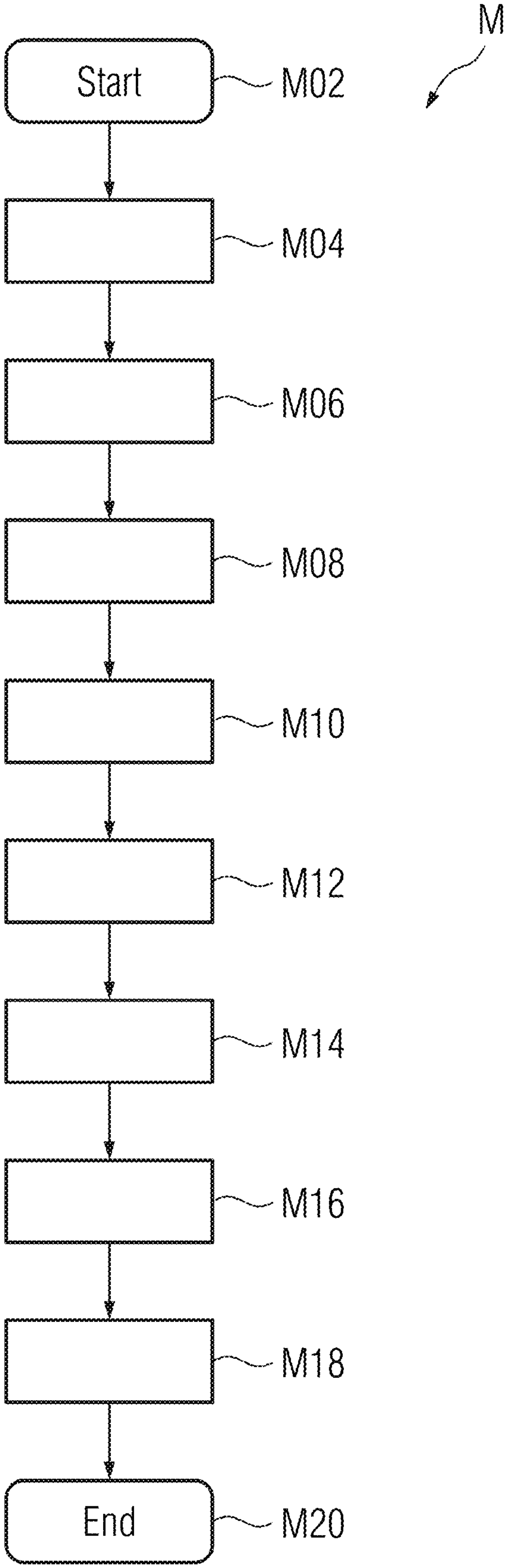
FIG. 5 depicts a flow diagram of an example methodology that facilitates managing an app in a product system.

Referring now to FIG. 5, a methodology M that facilitates managing apps, such as creating an app including developing a user interface of the app, is depicted. The method may start at M02, and the methodology may include several acts carried out through operation of at least one processor.

These acts may include an act M04 of providing an app development user interface (UI) of an app development platform to a user for developing the app; an act M06 of providing several UI parameters characterizing several properties of an app UI of the app; an act M08 of determining at least one sample app UI based on the provided UI parameters; an act M10 of displaying the respective sample app UI to the user via the app development UI; an act M12 of receiving user input indicative of an amendment to at least one of the properties of the sample app UI via the app development UI; an act M14 of determining amended UI parameters using the received user input; an act M16 of determining at least one updated sample app UI using the respective, amended UI parameter; and an act M18 of developing the app through the app development UI by using the updated sample app UI. At M20 the methodology may end.

It should further be appreciated that the methodology M may include other acts and features discussed previously with respect to the computer-implemented method of managing an app, such as creating an app including developing a user interface of the app.

Figure 6:
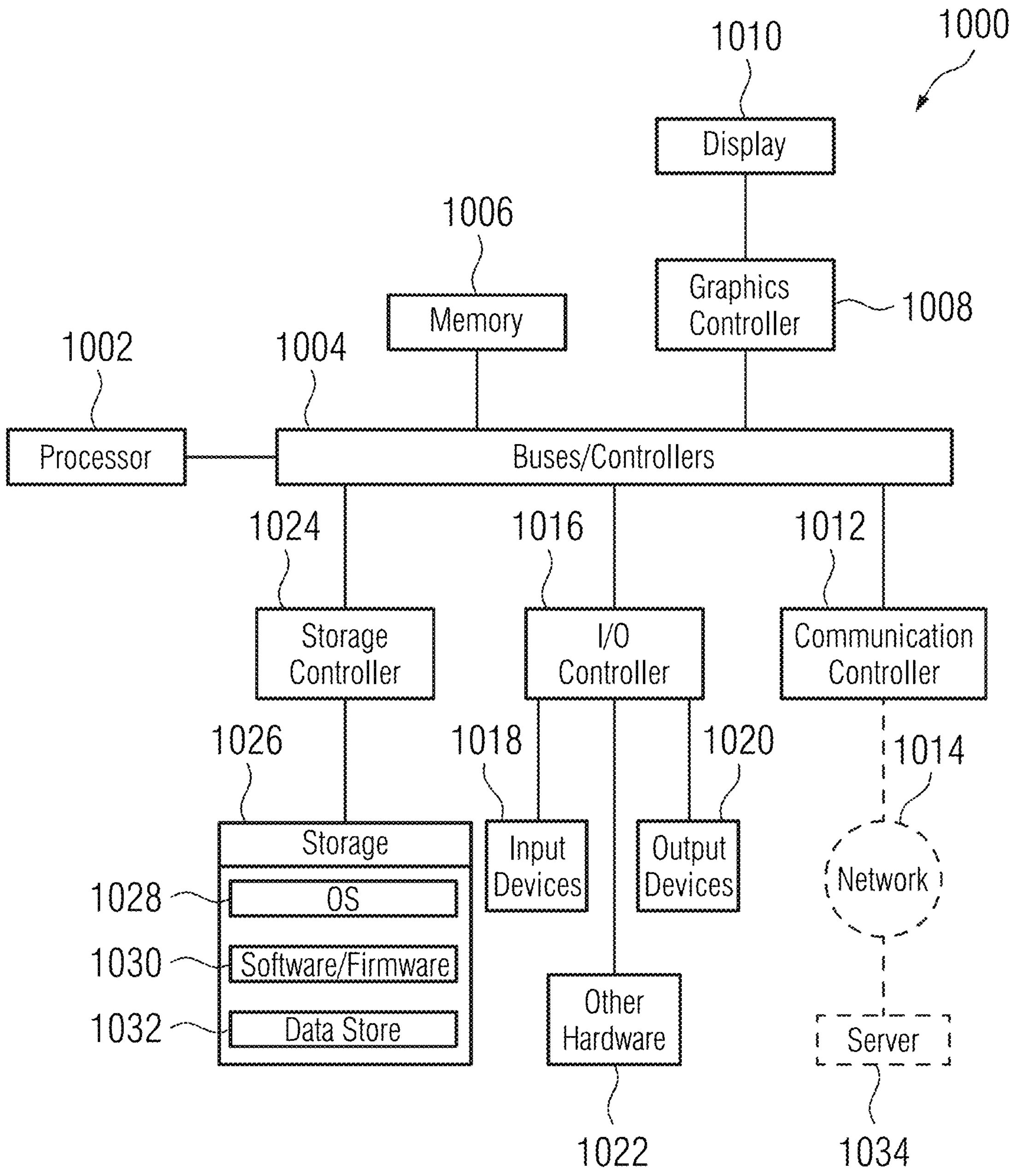
FIG. 6 depicts a block diagram of a data processing system in which an embodiment can be implemented.

FIG. 6 depicts a block diagram of a data processing system 1000 (also referred to as a computer system) in which an embodiment can be implemented, for example, as a portion of a product system, and/or other system operatively configured by software or otherwise to perform the processes as described herein. The data processing system 1000 may include, for example, the computer or IT system or data processing system 100 mentioned above. The data processing system depicted includes at least one processor 1002 (e.g., a CPU) that may be connected to one or more bridges/controllers/buses 1004 (e.g., a north bridge, a south bridge). One of the buses 1004, for example, may include one or more I/O buses such as a PCI Express bus. Also connected to various buses in the depicted example may include a main memory 1006 (RAM) and a graphics controller 1008. The graphics controller 1008 may be connected to one or more display devices 1010. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 1012 (Ethernet controllers, WiFi controllers, cellular controllers) operative to connect to a local area network (LAN), Wide Area Network (WAN), a cellular network, and/or other wired or wireless networks 1014 or communication equipment.

Further components connected to various busses may include one or more I/O controllers 1016 such as USB controllers, Bluetooth controllers, and/or dedicated audio controllers (connected to speakers and/or microphones). It should also be appreciated that various peripherals may be connected to the I/O controller(s) (via various ports and connections) including input devices 1018 (e.g., keyboard, mouse, pointer, touch screen, touch pad, drawing tablet, trackball, buttons, keypad, game controller, gamepad, camera, microphone, scanners, motion sensing devices that capture motion gestures), output devices 1020 (e.g., printers, speakers) or any other type of device that is operative to provide inputs to or receive outputs from the data processing system. Also, it should be appreciated that many devices referred to as input devices or output devices may both provide inputs and receive outputs of communications with the data processing system. For example, the processor 1002 may be integrated into a housing (such as a tablet) that includes a touch screen that serves as both an input and display device. Further, it should be appreciated that some input devices (such as a laptop) may include a plurality of different types of input devices (e.g., touch screen, touch pad, keyboard). Also, it should be appreciated that other peripheral hardware 1022 connected to the I/O controllers 1016 may include any type of device, machine, or component that is configured to communicate with a data processing system.

Additional components connected to various busses may include one or more storage controllers 1024 (e.g., SATA). A storage controller may be connected to a storage device 1026 such as one or more storage drives and/or any associated removable media, which can be any suitable non-transitory machine usable or machine-readable storage medium. Examples include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also, in some examples, a storage device such as an SSD may be connected directly to an I/O bus 1004 such as a PCI Express bus.

A data processing system in accordance with an embodiment of the present disclosure may include an operating system 1028, software/firmware 1030, and data stores 1032 (that may be stored on a storage device 1026 and/or the memory 1006). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 1012 may be connected to the network 1014 (not a part of data processing system 1000), which can be any public or private data processing system network or combination of networks, as known to those of skill in the art, including the Internet. Data processing system 1000 can communicate over the network 1014 with one or more other data processing systems such as a server 1034 (also not part of the data processing system 1000). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system, or part thereof that controls at least one operation, whether such a device is implemented in hardware, firmware, software, or some combination of at least two of the same. It should be noted that the functionality associated with any particular controller may be centralized or distributed, whether locally or remotely.

In addition, it should be appreciated that data processing systems may be implemented as virtual machines in a virtual machine architecture or cloud environment. For example, the processor 1002 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 1000 in this example may correspond to a computer, workstation, server, PC, notebook computer, tablet, mobile phone, and/or any other type of apparatus/system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

Also, it should be noted that the processor described herein may be located in a server that is remote from the display and input devices described herein. In such an example, the described display device and input device may be included in a client device that communicates with the server (and/or a virtual machine executing on the server) through a wired or wireless network (which may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In such examples, the processor described herein may correspond to a virtual processor of a virtual machine executing in a physical processor of the server.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1000 may conform to any of the various current implementations and practices known in the art.

Also, it should be understood that the words or phrases used herein should be construed broadly, unless expressly limited in some examples. For example, the terms "include" and "comprise," as well as derivatives thereof, mean inclusion without limitation. The singular forms "a," "an," and "the" are intended to comprise the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to comprise, be comprised within, interconnect with, contain, be contained within, connect to or with, couple to or with, be communicable with, cooperate with, interleave, juxtapose, be proximate to, be bound to or with, have, have a property of, or the like.

Also, although the terms "first," "second," "third," and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is executing the software/firmware, which is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may also correspond to a processor circuit particularly fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

In addition, the term "adjacent to" may mean: that an element is relatively near to but not in contact with a further element; or that the element is in contact with the further portion, unless the context clearly indicates otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present patent document should be read as implying that any particular element, step, act, or function is an essential element, which must be included in the claim scope: the scope of patented subject matter is defined only by the allowed claims.

The invention claimed is:

1. A computer-implemented method of creating an app, the method including:
- providing an app development user interface (UI) of an app development platform to a user for developing the app;
- providing UI parameters characterizing properties of an app UI of the app;
- determining at least one sample app UI based on the provided UI parameters;
- displaying the respective sample app UI to the user via the app development UI;
- receiving user input indicative of an amendment to at least one property of the properties of the sample app UI via the app development UI;
- receiving, separately from the user input indicative of the amendment, UI design constraints included in at least one styling guide, at least one template, at least one source of best practices, or a combination thereof;
- determining amended UI parameters using both the received user input and the received UI design constraints, wherein the amended UI parameters are determined based on the user input while applying the received UI design constraints as limitations on UI element usage;
- determining at least one updated sample app UI using the respective, amended UI parameter; and
- developing the app through the app development UI by using the updated sample app UI.

2. The computer-implemented method of claim 1, wherein the respective UI parameter characterizes a functional representation and/or a perceivable representation of at least an app UI element of the app UI.

3. The computer-implemented method of claim 2, wherein the determined respective sample app UI comprises at least one novel functional representation and/or perceivable representation of at least an app UI element of the app UI.

4. The computer-implemented method of claim 1, wherein the determining of the respective UI parameters comprises:

determining a first UI parameter set among the UI parameters using a first algorithm;

determining a second UI parameter set among the UI parameters using a second algorithm; and determining a third UI parameter set among the UI parameters using a third algorithm, wherein the first UI parameter set, the second UI parameter set, and the third UI parameter set characterize different visual aspects and/or functional aspects of the respective sample app UI.

5. The computer-implemented method of claim 1, wherein the UI parameters comprise at least one weighting UI parameter that assigns a respective weighting factor to at least two other UI parameters, and wherein the respective weighting UI parameter is used during the determining of the respective sample app UI.

6. The computer-implemented method of claim 1, wherein, during the determining of the respective UI parameters, a type of the app, and/or a type of the respective target device of the app are used.

7. The computer-implemented method of claim 1, wherein the providing of the UI parameters comprises:

providing textual UI input information; and determining at least one of the UI parameters from the provided textual UI input information using a trained function.

8. The computer-implemented method of claim 7, wherein the trained function uses a large language model or a generative model.

9. The computer-implemented method of claim 1, wherein the providing of the UI parameters comprises:

providing graphical UI input information; and determining at least one of the UI parameters from the provided graphical UI input information using a computer vision algorithm.

10. The computer-implemented method of claim 1, wherein the provided UI parameters comprise UI parameters characterizing properties of the app UI of the app at an earlier development stage, UI parameters characterizing properties of an app UI of a different app, or a combination thereof.

11. The computer-implemented method of claim 1, wherein the user input indicative of the amendment is received via user interaction with at least one interactive UI element displayed to the user via the app development UI, and wherein the respective interactive UI element comprises a button, a mixer, a text box to enable language interactions or to interact with a chatbot.

12. The computer-implemented method of claim 1, further comprising:

iterating the following steps at least once:

displaying the at least one updated sample app UI to the user via the app development UI;

receiving user input indicative of an amendment to at least one property of the properties of the updated sample app UI via the app development UI;

determining the respective amended UI parameters using the received user input; and determining the at least one updated sample app UI using the respective, amended UI parameter, wherein the app is developed through the app development UI by using a last, updated sample app UI.

13. The computer-implemented method of claim 11, further comprising performing the following steps in real-time:

receiving user input indicative of an amendment to at least one property of the properties of the sample app UI via the app development UI;

determining the respective amended UI parameters using the received user input;

determining the at least one updated sample app UI using the respective, amended UI parameter; and displaying the at least one updated sample app UI to the user via the app development UI.

14. The computer-implemented method of claim 1, wherein the determining of the at least one updated sample app UI comprises calculating a probability score that reflects how much of the amended UI parameters are met by the determined at least one updated sample app UI and iteratively creating updated sample app UIs with a target of obtaining an updated sample app UI with a higher probability score.

15. The computer-implemented method of claim 1, wherein the UI design constraints are included in the at least one styling guide.

16. The computer-implemented method of claim 1, wherein the UI design constraints are included in the at least one template.

17. The computer-implemented method of claim 1, wherein the UI design constraints are included in the one source of best practices.

18. The computer-implemented method of claim 1, wherein the UI design constraints comprise a layout structure and/or styling information, and wherein the styling information comprises a color of a structural element, a color of a background, a size of the structural element, a size of a label of the structural element, or combinations thereof.

19. A computer system comprising:

at least one processor configured to:

provide an app development user interface (UI) of an app development platform to a user for developing an app;

provide UI parameters characterizing properties of an app UI of the app;

determine at least one sample app UI based on the provided UI parameters;

display the respective sample app UI to the user via the app development UI;

receive user input indicative of an amendment to at least one property of the properties of the sample app UI via the app development UI;

receive, separately from the user input indicative of the amendment, UI design constraints included in at least one styling guide, at least one template, at least one source of best practices, or a combination thereof;

determine amended UI parameters using both the received user input and the received UI design constraints, wherein the amended UI parameters are determined based on the user input while applying the received UI design constraints as limitations on UI element usage;

determine at least one updated sample app UI using the respective, amended UI parameter; and develop the app through the app development UI by using the updated sample app UI.

20. A non-transitory computer-readable medium comprising a computer program product, wherein the computer program product includes computer program code that, when executed by a computer system, causes the computer system to:

provide an app development user interface (UI) of an app development platform to a user for developing an app;

provide UI parameters characterizing properties of an app UI of the app;

determine at least one sample app UI based on the provided UI parameters;

display the respective sample app UI to the user via the app development UI;

receive user input indicative of an amendment to at least one property of the properties of the sample app UI via the app development UI;

receive, separately from the user input indicative of the amendment, UI design constraints included in at least one styling guide, at least one template, at least one source of best practices, or a combination thereof;

determine amended UI parameters using both the received user input and the received UI design constraints, wherein the amended UI parameters are determined based on the user input while applying the received UI design constraints as limitations on UI element usage;

determine at least one updated sample app UI using the respective, amended UI parameter; and develop the app through the app development UI by using the updated sample app UI.

* * * * *